(12) United States Patent
Petterson

(10) Patent No.: US 8,171,883 B2
(45) Date of Patent: May 8, 2012

(54) MILKING ARRANGEMENT

(75) Inventor: Torbjorn Petterson, Gnesta (SE)

(73) Assignee: Delaval Holding AB, Tumba (SE)

( * ) Notice: Subject to any disclaimer, the term of this patent is extended or adjusted under 35 U.S.C. 154(b) by 665 days.

(21) Appl. No.: 11/813,572

(22) PCT Filed: Jan. 10, 2006

(86) PCT No.: PCT/SE2006/000039
§ 371 (c)(1),
(2), (4) Date: Jul. 9, 2007

(87) PCT Pub. No.: WO2006/073370
PCT Pub. Date: Jul. 13, 2006

(65) Prior Publication Data
US 2008/0202432 A1    Aug. 28, 2008

(30) Foreign Application Priority Data
Jan. 10, 2005   (SE) .................................. 0500043-5

(51) Int. Cl.
*A01J 5/017* (2006.01)
(52) U.S. Cl. .................................. 119/14.1; 119/14.08
(58) Field of Classification Search ............... 119/14.08, 119/14.11, 14.1, 14.14
See application file for complete search history.

(56) References Cited

U.S. PATENT DOCUMENTS

| | | | |
|---|---|---|---|
| 4,763,605 A * | 8/1988 | Braum | 119/14.03 |
| 5,020,477 A * | 6/1991 | Dessing et al. | 119/14.08 |
| 6,269,766 B1 | 8/2001 | Birk | |
| 6,532,893 B1 | 3/2003 | Edholm | |
| 7,066,108 B2 * | 6/2006 | Andersson et al. | 119/14.1 |
| 7,278,370 B2 * | 10/2007 | Van Den Berg et al. | 119/14.08 |
| 2004/0040512 A1 | 3/2004 | Hayne | |
| 2004/0200421 A1 | 10/2004 | Andersson et al. | |
| 2004/0216679 A1 * | 11/2004 | Ealy et al. | 119/14.08 |

FOREIGN PATENT DOCUMENTS

| | | |
|---|---|---|
| EP | 0 555 895 A1 | 8/1993 |
| EP | 0 792 579 A1 | 9/1997 |

(Continued)

OTHER PUBLICATIONS

International-Type Search Report issued May 25, 2005 by the Swedish Patent Office in Swedish Application 0500043-5, from which priority of the subject pending application is claimed.

*Primary Examiner* — Joshua J Michener
*Assistant Examiner* — Brian M O'Hara
(74) *Attorney, Agent, or Firm* — Hovey Williams LLP

(57) ABSTRACT

The invention refers to a milking arrangement including a milking box (2) adapted to received an animal to be milked and a milking device having a milk conduit and a set of teatcups (7) to be applied manually by an operator to the teats of an animal. Each teatcup has an upper opening for introducing the respective teat. The milking device draws milk from the animal via the teatcups and the milk conduit through the use of a low pressure. A support device (20) carries the teatcups in at least an idle position, in which the teatcups are located not to interfere with the animal and the operator, and an intermediate position, in which the teatcups are located more closely to the teats. Control equipment controls the support from the idle position to the intermediate position.

30 Claims, 5 Drawing Sheets

FOREIGN PATENT DOCUMENTS

| | | |
|---|---|---|
| EP | 0824858 A1 | 2/1998 |
| EP | 1 169 914 A2 | 1/2002 |
| EP | 0 900 523 B1 | 3/2002 |
| EP | 1 447 002 A1 | 8/2004 |
| GB | 803492 | 10/1958 |
| WO | 98/37756 A1 | 9/1998 |
| WO | WO 02/89562 A1 | 11/2002 |
| WO | WO 0289562 A1 * | 11/2002 |

* cited by examiner

MILKING ARRANGEMENT

This is a national phase application of International Application PCT/SE2006/000039 and claiming priority from Swedish Application No. 0500043-5 filed 10 Jan. 2005, the disclosures of which are incorporated herein by reference.

TECHNICAL FIELD OF THE INVENTION

The present invention refers generally to a milking arrangement for facilitating manual attachment of the teatcups to the teats of an animal to be milked. More specifically, the present invention refers to a milking arrangement including a stationary structure, in the structure at least one milking box adapted to receive an animal to be milked during a milking operation, a milking device having a milk conduit and a set of teatcups to be applied manually by an operator to the teats of the animal to be milked, each teatcup having an upper opening for introducing the respective teat, the milking device being adapted to draw milk from the animal via the teatcups and the milk conduit by means of an application of a low pressure, and a support device adapted to carry the teatcups in at least an idle position, in which the teacups are located not to interfere with the animal and the operator, and an intermediate position, in which the teatcups are located more closely to the teats of the animal than in the idle position.

BACKGROUND OF THE INVENTION

There are several different milking methods known today. One differs between manual milking, where the teatcups are attached manually and the milking operation is performed by hand, and machine milking, where the teatcups are attached manually and the milking is performed by a milking machine. Machine milking may be semi-automatic, i.e. the teatcups are still attached manually but automatically removed from the teats after the milking operation is finished. Such semi-automatic milking is the most frequent method today, especially in milking arrangements including a large number of animals. In recent time, fully automatic milking is also used, wherein the teatcups are attached in an automatic manner to the teats of the animal to be milked, which means that no manual operation is any longer needed.

This invention refers to an arrangement to be operated according to the semi-automatic milking method. In such an arrangement, the attachment of the teatcups is still a heavy and time-consuming work, wherein the operator has to move the teatcups to a position beneath the teats and to lift the teatcups for the attachment of the teatcups to the teats.

PRIOR ART

U.S. Pat. No. 6,532,893 (Edholm) discloses a support device for carrying a set of teatcups to be applied by an operator to the teats of an animal to be milked. Each teatcup has an upper opening for introducing the respective teat. A milking device is adapted to draw milk from the animal via the teatcups and a respective milk conduit by means of an application of a low pressure. The support device includes an arm with a carrying member on which the teatcups are mounted. The carrying member is adapted to be moved from an inactive position, in which the teacups are located beside the animal and to an active position, in which the teatcups are located more closely to the teats of the animal than in the inactive position. The active position permits the operator to apply the teatcups to the respective teat in an easy manner. The support device is adapted to be moved manually. A pneumatic cylinder may be provided for the raising and lowering of the arm with the carrying member. Optionally, the carrying member may be in the form of a claw.

WO02/089562 (DeLaval) discloses a device for carrying a milking member, which includes at least a teatcup and which, via a flexible conduit member, is connectable to a milking device arranged to provide a relatively low pressure. A support element is fixedly mounted to or at a milking box arranged to receive an animal to be milked. An arm arrangement is pivotably connected to the support element and arranged to support the milking member at least in connection with the application of said teatcup to a teat of said animal. The arm arrangement is moveable from a first position in which the milking member is located beside said animal, to a second position, in which the milking member is located below said animal. The device includes an activating member, which is arranged to initiate the application of said relatively low pressure to the milking member when the arm arrangement is moved from the first position towards the second position.

EP-B1-900 523 (Lely) discloses a milking arrangement for fully automatic milking of an animal. The arrangement includes a milking box adapted to receive an animal to be milked, and a milking device having a set of teatcups to be applied in an automatic manner to the teats of the animal to be milked. Each teatcup has an upper opening for introducing the respective teat and is connected to a milk collecting member by means of a milk conduit. A support device is adapted to carry the teatcups with the openings turned upwards and to move, in an automatic manner, the teatcups from a first position, in which the teacups are located beside the animal and to a second activity position, in which the teatcups are already applied to the teats.

EP-A-824 858 (Gascoigne Melotte) discloses a milking arrangement for milking of smaller ruminant animals, such as goats and sheep. The arrangement includes a milking box adapted to receive the animal to be milked, and a milking device having a claw connected to two teatcups via a respective short milk conduit. The teatcups are applied by an operator to the teats of the animal to be milked. A support device is adapted to carry the teatcups and to enable movement of the teatcups from a first parking position, in which the teacups are located beside the animal and to a second operating position, in which the teatcups are located beneath the teats of the animal. The short milk conduits have such a stiffness that the teatcups are held in an upright position in the operating position. A switch is provided for automatically starting the milking vacuum when the teatcups reach the operating position.

EP-A-1 447 002 (Prolion B. V.) discloses a milking device including teatcups and milk hoses for conveying the milk from the teatcups. The teatcups are held by teatcup holders secured to a milking rack. The milking rack is movable from a rest position to an activity position beneath the udder of the animal to be milked. The teatcups are held in a horizontal or in a vertical position in the respective teacup holder in the milking rack. It is provided for a manual operation of the device and an automatic operation of the device. This document describes a semi-automatic milking method and a fully automatic milking method. According to the semi-automatic milking method, the milking rack is moved manually from the rest position to the activity position whereby the teatcups are raised to the vertical position. The teatcups are then attached manually to the respective teat. According to the fully automatic milking method, the milking rack is moved automatically from the rest position to the activity position by means of a milking robot, whereby the teatcups are raised to the vertical position. The teatcups are then attached automatically to the respective teat, whereby the milking robot raises the milking rack so that the teats are introduced into the respective teatcups.

EP-A-555 895 (Lely) discloses several different embodiments of a milking arrangement. The first embodiments refers to a fully automatic milking arrangement including a milking robot provided for automatic attachment of the teatcups to the teats of an animal. The last embodiment refers to a semi-automatic milking arrangement including a manually rotatable arm carrying the teatcups in a rest position and in an activity position beneath the udder of the animal to be milked. After the milking operation it is provide for automatic detachment of the teatcups from the teats.

SUMMARY OF THE INVENTION

The object of the present invention is to improve the semi-automatic milking method. A further object of the present invention is to facilitate the manual attachment of the teatcups to the teats of an animal to be milked. A further object of the present invention is to provide a milking arrangement enabling a more efficient manual attachment of the teatcups to the teats of the animal to be milked.

This object is achieved by the milking arrangement initially defined, which is characterised in that it includes control equipment for controlling the support device to move in an automatic manner the teatcups from the idle position to the intermediate position. By such a control device the work to be done by the operator is significantly reduced, since the operator now only has to move the teatcups a relatively short distance from the intermediate position to the teats. The application of the teatcups may according to the invention thus be made in a shorter time than previously. Furthermore, according to the invention, the application work will be less heavy to the operator.

According to an embodiment of the invention, the intermediate position is an activity position permitting the operator to grip manually the respective teatcup and move it onto the respective teat, for instance by means of a substantially straight lifting movement, or a combined forward and lifting movement. Alternatively, the teatcups carried by the support device may be movable a relatively short distance from the intermediate position to an activity position permitting the operator to grip manually the respective teatcup and move it onto the respective teat. The teatcups carried by the support device may then be manually movable from the intermediate position to the activity position. This movement to the activity position may thus be performed manually, for instance by manually gripping to of the teatcups and pushing them in a forward direction to the activity position beneath the udder of the animal, from which position the teatcups then may be lifted onto the respective teats.

According to a further embodiment of the invention, the teatcups in the intermediate position are arranged in such a way that the openings are turned substantially upwards. Furthermore, the activity position may be such that the respective teatcup is moveable from the activity position onto the respective teat substantially without being rotated. Advantageously, the activity position permits the operator to apply the teatcups to the respective teat by a respective substantially straight movement of each teatcup from the activity position onto the respective teat.

According to a further embodiment of the invention, the teatcups in the idle position are located beside the animal. In such a way, the teatcups and the support device will not interfere with the animal, for instance when the animal enters the milking box.

According to a further embodiment of the invention, the teatcups in the idle position are turned at least partly downwards. In such a way, it is prevented that dirt or any other undesired particles enter the teatcups through the openings when the teatcups are in the idle position.

According to a further embodiment of the invention, the arrangement includes in the structure an operator area adjacent to the milking box. Advantageously, the teatcups may then in the idle position be located within the operator area outside the milking box. Furthermore, the operator area has a floor for the operator and the milking box has a floor for the animal, the floor of the operator area being located at a lower level than the floor of the milking box, wherein the teatcups in the idle position are located at least partly beneath the floor of the milking box.

According to a further embodiment of the invention, the support device includes a base element and an arm which is rotatable with respect to the base element and extends in a forward direction of the arm from a proximal end of the arm to a distal end of the arm. The arm may then be rotated for moving the teatcups from the idle position to the intermediate position. Advantageously, the arm may be attached to the base element via an intermediate element including at least one rotary joint. The intermediate element may include a first rotary joint connected to the arm and a second rotary joint connected to the base element. Furthermore, the arm may be extendable in the forward direction.

According to a further embodiment of the invention, the base element is attached to the stationary structure outside the milking box. The stationary structure may then include a rail element provided outside the milking box, the base element being displaceable along the rail element. In such a way the support device may easily be moved laterally to a position in which the support device and the teatcups does not interfere with the operator, for instance when the operator cleans the teats of the animal.

According to a further embodiment of the invention, the arrangement includes in the structure a large number of milking boxes for receiving a respective animal to be milked during a respective milking operation, each milking box being operable by the operator and associated with a respective one of said milking device and a respective one of said support device. In such an arrangement milking of a very large number of animals may be performed in an efficient manner. Preferably, each of the milking boxes are positioned in such a way that they is reachable by the operator from the operator area. Advantageously, the rail element extends along a plurality of said milking boxes.

According to a further embodiment of the invention, the milking device includes a milking member connected to the milk conduit and including a claw and the set of teatcups, wherein the teatcups are connected to the claw by means of a respective short milk conduit. Advantageously, each short milk conduit may have such a stiffness that the teatcups are maintained in the intermediate position with the openings turned substantially upwards. Furthermore, each short milk conduit may be attached to the respective teatcup at an upper part of an outer side surface of the teatcup, wherein each short milk conduit may have a first substantially straight portion connected to the claw and a second substantially straight portion connected to the respective teatcup, the first straight portion being approximately perpendicular to the second straight portion. The first portion may extend substantially vertically in the intermediate position.

According to a further embodiment of the invention, the second portion extends approximately in the forward direction from the respective teatcup. Consequently, the teacups will be located behind the distal end of the arm, which is advantageous during the movement of the teatcups and the milking member from the idle position to the intermediate position and the activity position beneath the udder of the animal, since the risk is reduced that the teatcups will be hindered by the legs of the animal.

According to a further embodiment of the invention, the control equipment includes a primary sensor for sensing a primary state, the control equipment being adapted to initiate the movement of the support device, moving the teatcups from the idle position to the intermediate position, in response to the sensed primary state. The primary state may be obtained, for instance, when a cleaning operation of the teats, preceding the milking operation, has been completed, when a stimulation operation of the teats, preceding the milking operation, has been completed, and/or when the operator has initiated the application of the teatcups to the animal in an adjoining milking box.

According to a further embodiment of the invention, the control equipment is adapted to initiate the movement of the support device only when no person is located within a predetermined area in the proximity of the milking box.

According to a further embodiment of the invention, the control equipment includes a secondary sensor for sensing a secondary state, wherein the control equipment is adapted to initiate the application of the low pressure in response to the sensed secondary state. The secondary state may be obtained, for instance, when, at the earliest, the movement of the support device, moving the teatcups from the idle position to the intermediate position, has been initiated, when the teatcups are in the activity position, when the operator has gripped at least one of the teatcups, and/or when at least one of the teats has been introduced into the respective opening.

BRIEF DESCRIPTION OF THE DRAWINGS

The present invention is now to be explained more closely by means of the description of various embodiments and with reference to the drawings attached hereto.

DETAILED DESCRIPTION OF VARIOUS EMBODIMENTS OF THE INVENTION

Figure 1:
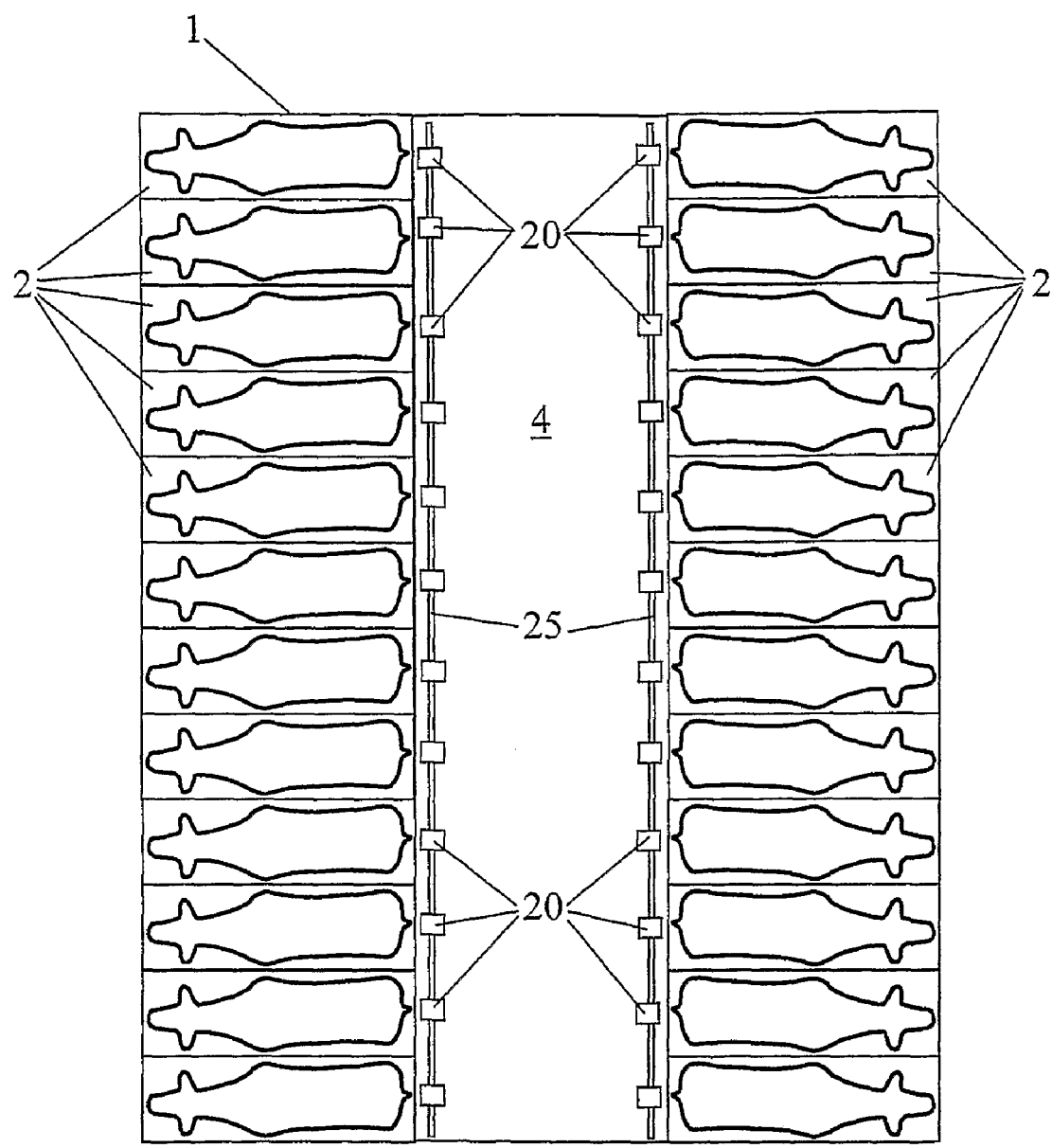
FIG. 1 shows schematically a first embodiment of a milking arrangement according to the invention.
Figure 2:
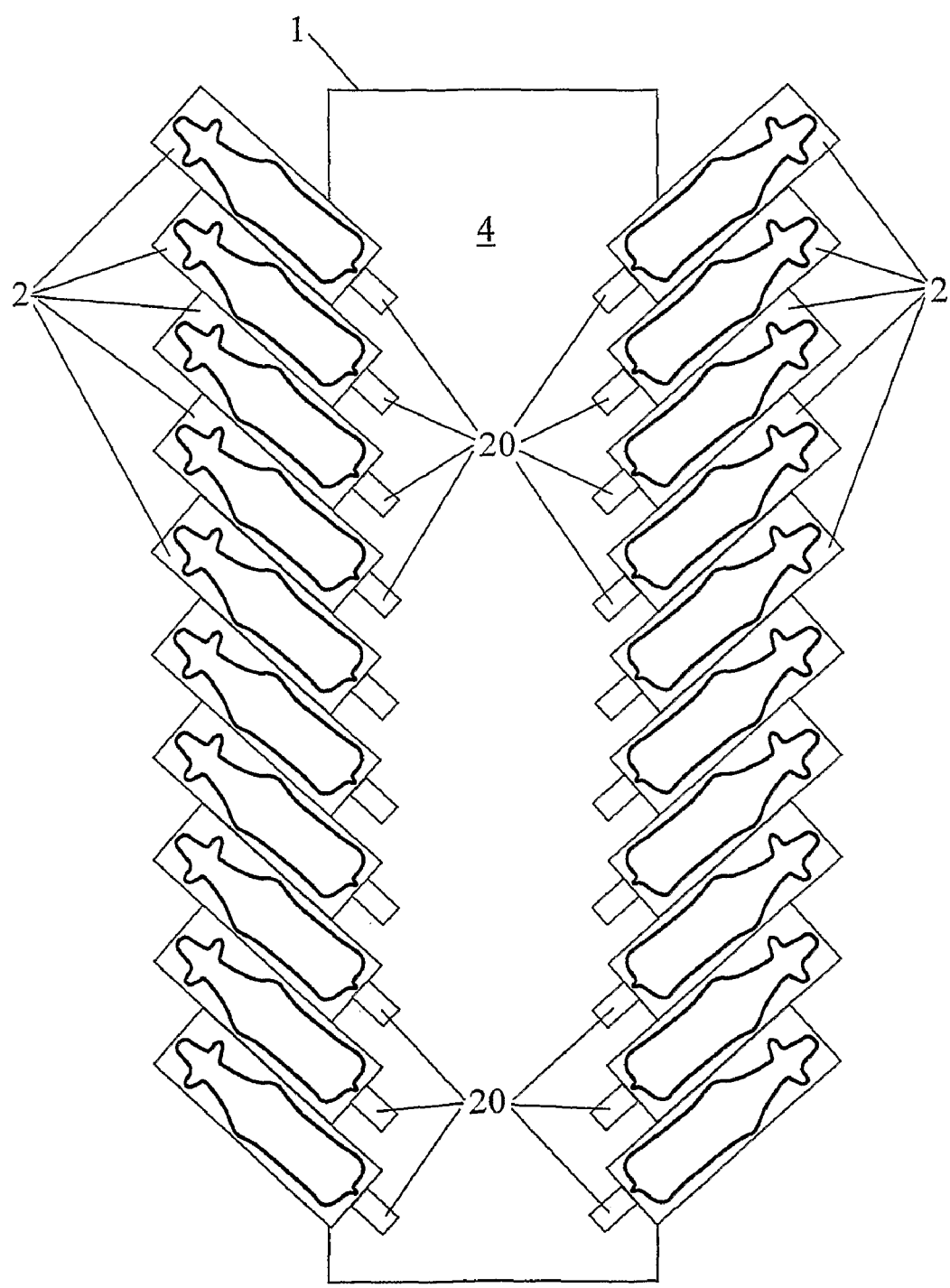
FIG. 2 shows schematically a second embodiment of a milking arrangement according to the invention.

FIG. 1 discloses a first embodiment of a milking arrangement including a stationary structure 1 in the form of a milking stall having a large number of milking boxes 2, each adapted to house one single animal for milking of the animal during a respective milking operation. In the first embodiment, the milking boxes 2 are arranged in a so called side by side parlour. FIG. 2 discloses a second embodiment which differs from the first embodiment in that the milking boxes 2 are arranged in a so called herringbone parlour. It is to be noted that the milking arrangement according to this invention can be employed in any layout of the milking boxes 2. Also the number of milking boxes 2 in the milking arrangement may be varied within the scope of the invention, from one single milking box 2 to a very large number of milking boxes 2 as indicated in FIGS. 1 and 2.

Figure 3:
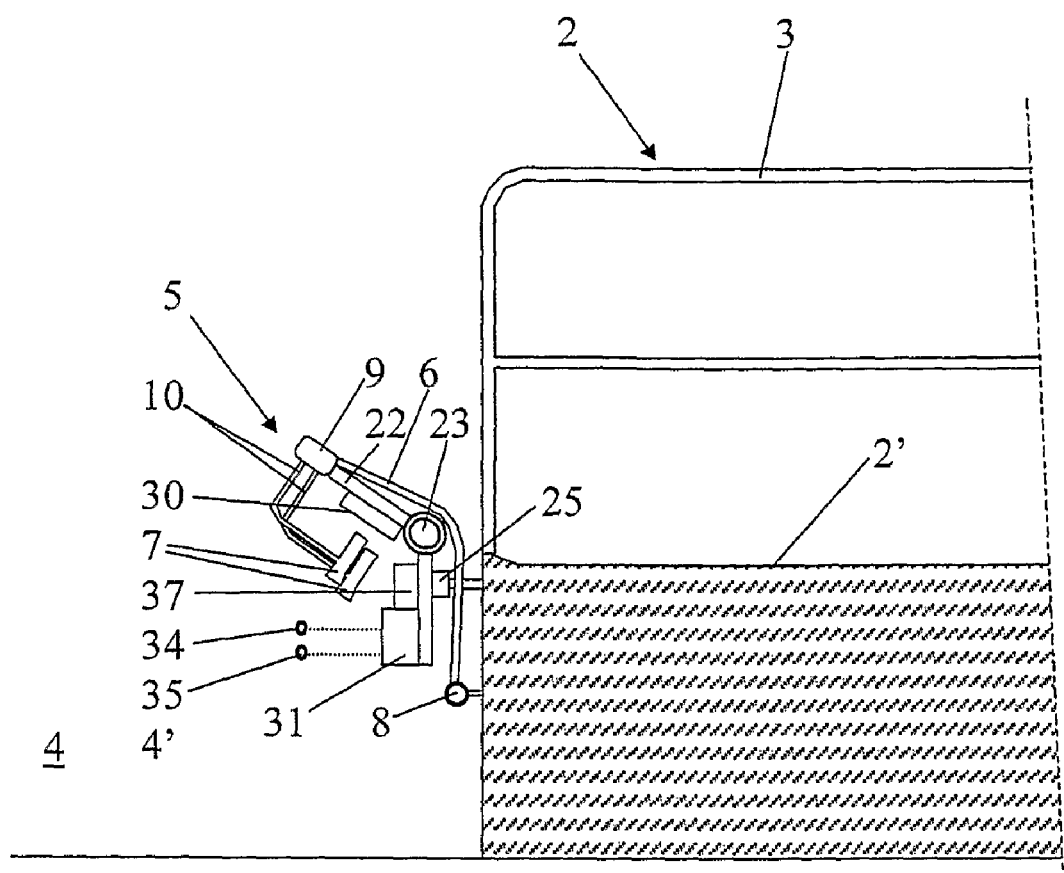
FIG. 3 shows schematically a side view of a milking box with a milking member in an idle position.
Figure 4:
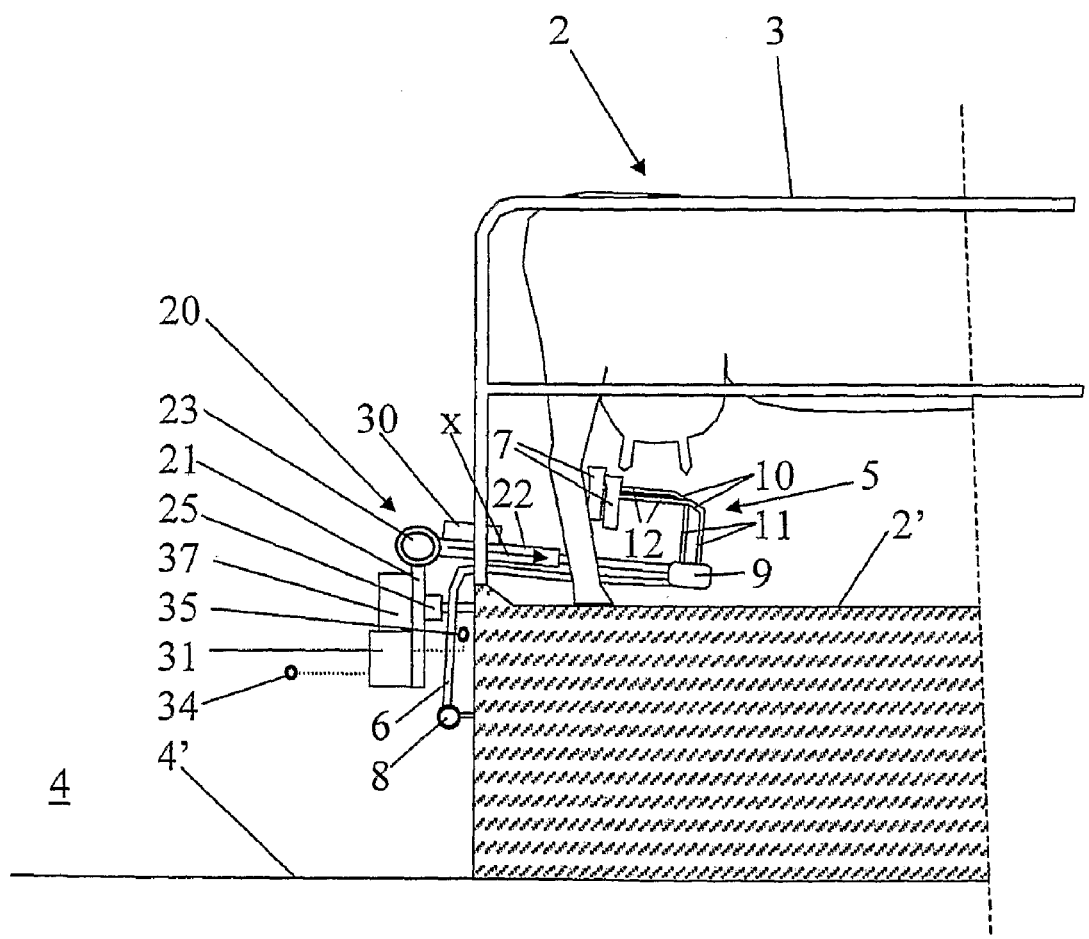
FIG. 4 shows schematically a side view of the milking box with the milking member in an intermediate position.
Figure 5:
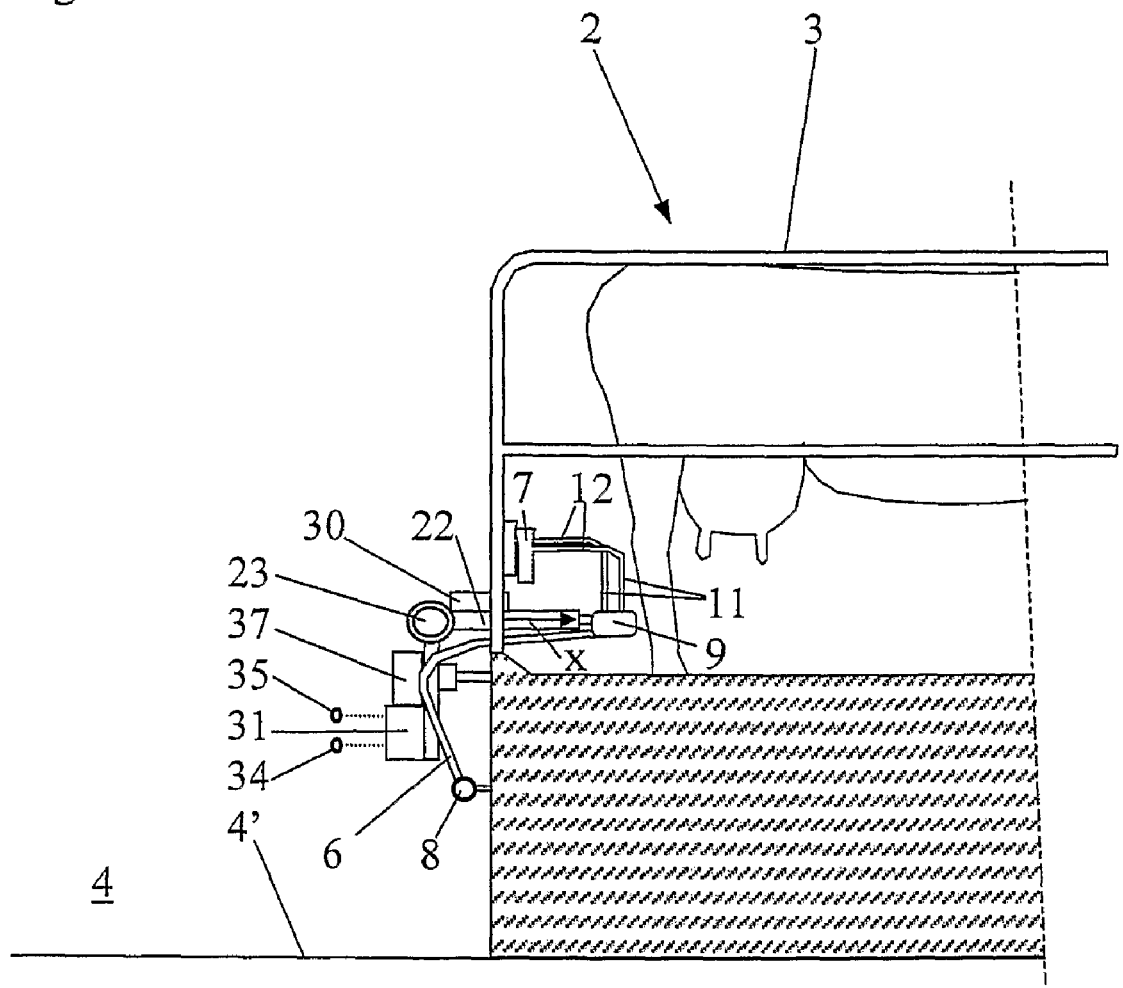
FIG. 5 shows schematically a side view of the milking box with the milking member in another intermediate position.

The expression milking box 2 used in this application shall be given a broad interpretation. It is meant to mean an area where the animal is positioned during the milking operation. This milking area is preferably limited in any suitable manner in order to ensure that the animal can not walk away during the milking operation and only move around in a limited manner. The milking area of the milking boxes 2 may be defined by any suitable enclosure means 3 as indicated in FIGS. 3-5.

The stationary structure 1 of the milking arrangement includes an operator area 4 adjacent to the milking boxes 2. The operator area 4 is adapted to house one or several operators for performing the milking operation of the animal in each of the milking boxes 2. The operator area 4 is located in such a way that the operator or operators may easily reach each of the milking boxes 2, and especially the udder of the animal present in the respective milking box 2. To this end, the operator area 4 has a floor 4' for the operator and the milking box 2 has a floor 2' for the animal, see FIGS. 3-5, wherein the floor 4' of the operator area 4 is located at a lower level than the floor 2' of the milking box 2.

The milking arrangement also includes, for each milking box 2, a milking device having a milk conduit 6 and a set of teatcups 7. Each teatcup 7 has an upper opening through which a teat of the animal to be milked may be introduced in a manner known per se. The milk conduit 6 is connected to a milk line 8, see FIGS. 3-5. The milking device is adapted to draw milk from the animal via the teatcups 7, the milk conduit 6 and the milk line 8 by means of an application of a low pressure. The low pressure is provided by a vacuum pump (not shown) in a manner known per se.

In the embodiments disclosed, the milking device includes a milking member 5 connected to the milk conduit 6 and including a claw 9 and the teatcups 7. The milking member 5 includes four teatcups 7 connected to the claw 9 although only two teatcups 7 can be seen in FIGS. 3-5. Each teatcup 7 is connected to the claw 9 by means of a respective short milk conduit 10. Each short milk conduit 10 has a first substantially straight portion 11 connected to the claw 9 and a second substantially straight portion 12 connected to the respective teatcup 7, see FIG. 4. The first straight portion 11 is approximately perpendicular to the second straight portion 12. Each short milk conduit 10 is attached to the respective teatcup 7 at an upper part of an outer side surface of the teatcup 7.

The milking arrangement includes, for each milking box 2, a support device 20 adapted to carry the teatcups 7 in at least three different positions, illustrated in FIGS. 3, 4 and 5, respectively, to be explained below. In the embodiments disclosed, the milking boxes 2 are adapted to receive the animals with their rear end turned to the operator area 4. The milking member 5 and the support device 20 may thus be introduced beneath the animals between the rear legs of the animals. It is to be noted that the invention is also applicable to milking arrangements where the milking member 5 is introduced in another direction, for instance laterally between a forward leg and a rear leg of the animal.

FIG. 3 discloses an idle position, in which the teatcups 7 are located not to interfere with the animal and the operator 8. In particular, the teatcups 7 are located in the operator area 4 beside the animal and outside the milking box 2 in the idle position. As can be seen in FIG. 3, substantially no parts of the milking device or the support device 20 extends into the milking area of the milking box 2 when the teatcups 7 are in the idle position. Moreover, the teatcups 7 are turned at least partly downwards in the idle position so that substantially no dirt may enter the teatcups 7 through the openings when the teatcups 7 are not in use. The teatcups 7 may also be located at least partly beneath the level of the floor 2' of the milking box 2 when being in the idle position are.

FIG. 4 discloses an intermediate position, in which the teatcups 7 are located more closely to the teats of the animal than in the idle position. The intermediate position disclosed in FIG. 4 is an activity position permitting the operator to grip manually the respective teatcup 7 and move it onto the respective teat. The activity position is such that the respective teatcup 7 is moveable from the activity position onto the respective teat substantially without being rotated. Moreover, the activity position permits the operator to apply the teatcups 7 to the respective teat by a respective substantially straight movement of each teatcup 7 from the activity position onto the respective teat.

FIG. 5 discloses another intermediate position, in which the teatcups 7 carried by the support device 20 are manually movable a relatively short distance from the intermediate position to the activity position permitting the operator to grip manually the respective teatcup 7 and move it onto the respective teat.

Each short milk conduit 10 has a relatively high stiffness so that the teatcup 7 is maintained with the opening turned substantially upwards when the teatcups 7 are in the intermediate position and the activity position. In the intermediate position and the activity position, the first portion 11 extends substantially vertically and the second portion 12 extends substantially horizontally.

The support device 20 includes a base element 21 and an arm 22 which is rotatable with respect to the base element 21. The arm 22 extends in a forward direction x of the arm 22 from a proximal end of the arm 22 to a distal end of the arm. In the embodiment disclosed in FIGS. 3-5, the arm 22 is attached, at the proximal end, to the base element 21 via an intermediate element 23 including at least one rotary joint. The arm 22 is thus rotatable around the intermediate element 23 in at least one vertical plane. As an alternative solution, not shown, the intermediate element 23 may include a first rotary joint connected to the proximal end of the arm 22 and a second rotary joint connected to the base element 21.

The arm 22 is extendable in the forward direction x. The arm 22 may for instance be realised by a telescopic arm including two or more telescopically connected elements. In the embodiment disclosed two such elements are shown. The milking member 5, i.e. the claw 9 is attached to the distal, or forward end, of the arm 22. As can be seen in FIGS. 3-5, the second portion 12 of the short milk conduit 10 extends approximately in the forward direction x of the arm 22 from the respective teatcup 7. The teatcups 7 are thus positioned behind the claw 9 seen in the forward direction. Such a positioning of the teatcups 7 is advantageous, especially when the teatcups 7 are moved to the intermediate position and the activity position, since it reduces the risk for interference with the legs of the animal.

The base element 21 is attached to the stationary structure 1 outside the milking box 2. Especially, the base element 21 may be mounted to a substantially vertical wall connecting the floor 2' of the milking box 2 and the floor 4' of the operator area 4. In the embodiments disclosed, the stationary structure 1 includes a rail element 25 provided outside the milking box 2 and mounted to the substantially vertical wall. As can be seen in FIG. 1, the rail element 25 extends along a plurality of said milking boxes 2, wherein the base element 25 may be displaceable along the rail element 25, at least a short distance corresponding to the width of the respective milking box 2.

The milking arrangement includes, for each milking device and support device 20, control equipment for controlling the support device 20 to move in an automatic manner the teatcups 7 from the idle position to the intermediate position. The control equipment may include a motor device 30 and a control unit 31, both schematically indicated in FIGS. 3-5. The motor device 30 acts on the arm 22 to rotate the arm 22 in relation to the base element 21. The motor device 30 may also be adapted to provide a linear force for the prolonging the arm 22 in the forward direction x to an extended state and/or for withdrawing the arm 22 from the extended state. It is to be noted that the movements of the arm 22 may be produced in various ways by various motor devices 30. The motor device 30 may for instance be realised by an electrical motor, a hydraulic motor, a pneumatic motor or a combination of such motors.

The support device 20 and the associated motor device 30 are controlled by the control unit 31. The milking arrangement may include a control unit 31 for controlling all support devices 20, or several control units 31, for instance one control unit 31 for each support device 20.

The control equipment also includes, for each milking box 2, a primary sensor 34 for sensing a primary state. The control equipment, i.e. the respective control unit 31, is adapted to initiate the movement of the support device 20, moving the teatcups 7 from the idle position to the intermediate position, in response to the sensed primary state.

The primary state may include one or several different conditions. For instance, the primary state may be obtained when a cleaning operation of the teats, preceding the milking operation, has been completed, or when a stimulation operation of the teats, preceding the milking operation, has been completed. The primary sensor 34 may then be adapted to sense the movements or any other suitable actions of the operator performing the cleaning and the stimulation, respectively, of the teats, for instance when the operator takes any action with respect to the cleaning or stimulating equipment used. The primary state may also be obtained when the operator has initiated the application of the teatcups 7 to the animal in an adjoining milking box 2. The primary sensor 34 may then be provided in the adjoining milking box or in the adjoining support device 20 or control unit 31 associated therewith.

A further alternative, or preferably complementary, condition for the achievement of the primary state may be when no person is located within a predetermined area in the proximity of the milking box 2. In such a way it may be prevented that the operator will not be injured by the movement of the support device 20. In the case, the primary sensor 34 may include a proximity sensor sensing any person in the predetermined area in the operator area 4.

The primary sensor 34 may also include a button or the like to be deliberately activated by the operator when the movement is to be initiated.

Furthermore, the control equipment includes a secondary sensor 35 for sensing a secondary state. The control equipment, i.e. the respective control unit 31, may then be adapted to initiate the application of the low pressure in response to the sensed secondary state.

Also the secondary state may include one or several different conditions. For instance the secondary state may be obtained, at the earliest, when the movement of the support device 20, moving the teatcups 7 from the idle position to the intermediate position, has been initiated, when the teatcups 7 are in the activity position, when the operator has gripped at least one of the teatcups 7, or when at least one of the teats has been introduced into the opening of the respective teatcup 7.

When the milking operation is to be terminated, the low pressure is switched off and the teatcups 7 are removed from the teats. Such a removal may be achieved with the aid of a retraction device 37, which is also controlled by the respective control unit 31. After or during the removal the teatcups 7, are also retracted from the activity position either directly to the idle position or first to the intermediate position and then to the idle position. Such a retraction movement or movements may be performed automatically with the aid of the motor device 30 and/or the retraction device 37. During the retraction, e.g. in the intermediate position, the sweep operation, i.e. the additional suction by means of an additional low pressure, may be performed in order to ensure that the milk possibly remaining in the milking member 5 is sucked into the milk line 8.

The present invention is not limited to the embodiments described but may be varied and modified within the scope of the following claims.

The invention claimed is:

1. A milking arrangement comprising:
   a stationary structure;
   in the structure, at least one milking box adapted to receive an animal to be milked during a milking operation;
   a milking device having a milk conduit and a set of teatcups to be applied manually by an operator to the teats of the animal to be milked, each teatcup having an upper opening for introducing the respective teat, the milking device being adapted to draw milk from the animal via the teatcups and the milk conduit by means of an application of a low pressure;
   a support device adapted to carry the teatcups in at least an idle position, in which the teatcups are located not to interfere with the animal and the operator, and an intermediate position, in which the teatcups are located more closely to the teats of the animal than in the idle position and permit a respective teatcup to be manually gripped by the operator and moved onto the respective teat of the animal; and
   control equipment including a motor device and a control unit operable for controlling the support device and moving the teatcups in an automatic manner from the idle position to the intermediate position, wherein the teatcups are turned at least partly downwards in the idle position,
   wherein the arrangement includes in the structure a large number of milking boxes for receiving a respective animal to be milked during a respective milking operation, each milking box being operable by the operator and associated with a respective one of said milking device and a respective one of said support device,
   wherein the control equipment includes a primary sensor for sensing a primary state, the control equipment being adapted to initiate the movement of the support device, thereby moving the teatcups from the idle position to the intermediate position, in response to the sensed primary state,
   wherein the control equipment includes a secondary sensor for sensing a secondary state, wherein the control unit is configured to initiate the application of the low pressure in response to the secondary state, wherein the secondary state corresponds to the initiation of movement of the support device and initiation of movement of the teatcups from the idle position to the intermediate position
   wherein the milking device includes a milking member connected to the milk conduit and including a claw and the set of teatcups, and
   wherein the teatcups are connected to the claw by means of a respective short milk conduit.

2. An arrangement according to claim 1, wherein the intermediate position is an activity position permitting the operator to manually grip the respective teatcup and move it onto the respective teat.

3. An arrangement according to claim 1, wherein the teatcups carried by the support device are movable a relatively short distance from the inteiniediate position to an activity position permitting the operator to manually grip the respective teatcup and move it onto the respective teat.

4. An arrangement according to claim 3, wherein the teatcups carried by the support device are manually movable from the intermediate position to the activity position.

5. An arrangement according to claim 2, wherein the teatcups in the intermediate position are arranged in such a way that the openings are turned substantially upwards.

6. An arrangement according to claim 2, wherein the activity position is such that the respective teatcup is moveable from the activity position onto the respective teat substantially without being rotated.

7. An arrangement according to claim 2, wherein the activity position permits the operator to apply the teatcups to the respective teat by a respective substantially straight movement of each teatcup from the activity position onto the respective teat.

8. An arrangement according to claim 1, wherein the teatcups, when located in the idle position, are located beside the animal.

9. An arrangement according to claim 1, wherein the arrangement includes, in the structure, an operator area adjacent to the milking box.

10. An arrangement according to claim 9, wherein the teatcups, when positioned in the idle position, are located within the operator area outside the milking box.

11. An arrangement according to claim 9, wherein the operator area has a floor for the operator and the milking box has a floor for the animal, the floor of the operator area being located at a lower level than the floor of the milking box, wherein the teatcups, when in the idle position, are located at least partly beneath the floor of the milking box.

12. An arrangement according to claim 1, wherein the support device includes a base element and an arm which is rotatable with respect to the base element and extends in a forward direction of the arm from a proximal end of the arm to a distal end of the arm.

13. An arrangement according to claim 12, wherein the arm is attached to the base element via an intermediate element including at least one rotary joint.

14. An arrangement according to claim 12, wherein the arm is extendable in the forward direction.

15. An arrangement according to claim 12, wherein the base element is attached to the stationary structure outside the milking box.

16. An arrangement according to claim 15, wherein the stationary structure includes a rail element provided outside the milking box, the base element being displaceable along the rail element.

17. An arrangement according to claim 15, wherein the stationary structure includes a rail element provided outside the milking box, the base element being displaceable along the rail element, and wherein the rail element extends along a plurality of said milking boxes.

18. An arrangement according to claim 17, wherein the control equipment includes a primary sensor for sensing a primary state, the control equipment being adapted to initiate the movement of the support device, moving the teatcups from the idle position to the intermediate position, in response to the sensed primary state, and wherein the control equipment is adapted to initiate the movement of the support device, thereby moving the teatcups from the idle position to the intermediate position, when the operator has initiated the application of the teatcups to the animal in an adjoining milking box.

19. An arrangement according to claim 1, wherein each short milk conduit has such a stiffness that the teatcups are maintained in the intermediate position with the openings turned substantially upwards.

20. An arrangement according to claim 1, wherein each short milk conduit is attached to the respective teatcup at an upper part of an outer side surface of the teatcup.

21. An arrangement according to claim 1, wherein each short milk conduit has a first substantially straight portion connected to the claw and a second substantially straight portion connected to the respective teatcup, the first straight portion being approximately perpendicular to the second straight portion.

22. An arrangement according to claim 21, wherein the first portion extends substantially vertically in the intermediate position.

23. An arrangement according to claim 22, wherein, the support device includes a base element and an arm which is rotatable with respect to the base element and extends in a forward direction of the arm from a proximal end of the arm to a distal end of the arm, and wherein the second portion extends approximately in the forward direction from the respective teatcup.

24. An arrangement according to claim 1, wherein the primary state is obtained when a cleaning operation of the teats, preceding the milking operation, has been completed.

25. An arrangement according to claim 1, wherein the primary state is obtained when a stimulation operation of the teats, preceding the milking operation, has been completed.

26. An arrangement according to claim 1, wherein the control equipment is adapted to initiate the movement of the support device only when no person is located within a predetermined area in the proximity of the milking box.

27. An arrangement according to claim 1, wherein the intermediate position is an activity position permitting the operator to manually grip the respective teatcup and move it onto the respective teat, and wherein the secondary state is obtained when the teatcups are in the activity position.

28. An arrangement according to claim 27, wherein the secondary state is obtained when the operator has gripped at least one of the teatcups.

29. An arrangement according to claim 1, wherein the secondary state is obtained when at least one of the teats has been introduced into the opening of the respective teatcup.

30. An arrangement according to claim 1, wherein the support device includes an arm and a base and wherein the motor device acts on the support device to rotate the arm in relation to the base and to extend the arm.

* * * * *